United States Patent
Ver Hage (10) Patent No.: US 6,293,227 B1
(45) Date of Patent: Sep. 25, 2001

(54) ANIMAL CAGE AND METHOD FOR MAKING SAME

(76) Inventor: Richard P. Ver Hage, 95 Oakdale Ct., North Haledon, NJ (US) 07508

( * ) Notice: Subject to any disclaimer, the term of this patent is extended or adjusted under 35 U.S.C. 154(b) by 0 days.

(21) Appl. No.: 09/436,924

(22) Filed: Nov. 7, 1999

(51) Int. Cl.⁷ .................................................. A01K 1/03
(52) U.S. Cl. .......................................................... 119/417
(58) Field of Search .................................. 119/165, 166, 119/167, 168, 169, 170, 417

(56) References Cited

U.S. PATENT DOCUMENTS

| | | | |
|---|---|---|---|
| 3,831,557 | * 8/1974 | Elesh | 119/165 |
| 4,111,157 | * 9/1978 | Haugen | 119/165 |
| 4,325,325 | * 4/1982 | Larter | 119/165 |
| 4,615,300 | * 10/1986 | McDonough | 119/165 |
| 5,012,765 | * 5/1991 | Naso et al. | 119/166 |
| 5,894,816 | 4/1999 | Coiro, Sr. et al. | |

* cited by examiner

Primary Examiner—Thomas Price
(74) Attorney, Agent, or Firm—W. Patrick Quast

(57) ABSTRACT

An improved mold releasing technique including use of moveable segments to form a part of the male portion of the mold, and the unique product formed thereby is described. The moveable segments which disengage from integral contact with the product once it is formed, permit the formation of the uniquely formed product which includes side and end walls which can be less than 1 degree off vertical. This enables the manipulation of the product design parameters including each wall angle at various points along the wall to achieve a desired wall surface profile especially in the vicinity of the product floor. This results in an increased surface area at or near the product floor which permits a greater number of animals to be housed in the cage product in accordance with Federal guidelines. The tailoring of the wall profiles also allow for the nesting of the products and the accommodation of prior art covers and accessories.

10 Claims, 12 Drawing Sheets

ANIMAL CAGE AND METHOD FOR MAKING SAME

FIELD OF THE INVENTION

Animal cages and specifically to an animal cage design which provides for increased animal density.

BACKGROUND OF THE INVENTION

Increasing animal research has resulted in a corresponding elevated burden on research and caretaking facilities. They have been forced to rethink ways to maximize the animal housing capabilities of existing areas as one way of holding the line on the concomitant increase in expenses attending this expanding research. How to provide for the increasing numbers of animals in limited space, doing everything possible to restrain increased costs—that is the challenge.

Of course, the humane treatment of the animals cannot be sacrificed to accommodate the bottom line. As such, cage manufacturers are guided in their designs by the standards publication for the industry, *Guide for the Care and Use of Laboratory Animals*, issued by the U.S. Department of Health and Human Services. This document sets various standards for cage size for commonly used laboratory rodents. One such size measurement, critical to space allocation is the floor area/animal.

Lab Products, Inc. of Seaford, Delaware developed a system that efficiently accommodated more rodents per cage in their "One Cage" system. Each cage provided at least an 80 $in^2$ floor area which accommodated five adult mice over 25 grams according to the Guide standards. However, their specific design required use of new cage accessories including the wire lids and microbarrier tops.

Allentown Caging Equipment of Allentown, N.J., developed their "JAG$^{75}$" cage which it is represented meets the Guide requirement of 75 $in^2$ for accommodating five adult mice over 25 grams. Allentown relies on the placement of a jag in the sidewalls of the cage. This results in two-section, walls with the bottom section wider or thicker than the top section. The jag as described would appear to enhance the failure possibilities of the cage during manufacture and especially when subjected to higher temperature autoclaving. Further the jag is aesthetically unsightly and provides a ledge where undesirable materials can easily lodge but not as readily be dislodged. Still further, subsequent to its introduction in the market place, it appears that it does not stack all that well. Apparently the minimum amount of clearance gained between the top wall on one cage and the bottom wall of the unit on top is insufficient to permit ready separation, once stacked. It is believed that the so-called "JAG$^{75}$" cage is described in U.S. Pat. No. 5,894,196.

In the '816 patent, Allentown's inventors interpret the Guide standard of 75 $in^2$ as being practically implementable at a 0.5 inch height above the floor surface due to the presence of animal bedding which would consume this 0.5 inches (see col. 4, ls 24–34). For purposes of the present invention this pragmatic approach is also assumed.

In the '816 patent, at column 5, lines 11–14, the inventors indicate that "[i]t would not be possible, however, to obtain the desired increase usable floor space while maintaining compatibility with prior art top covers by adjusting the taper of the walls and the radius of curvature alone." The present invention, utilizing its innovative mold release techniques, does achieve the necessary compatibility with existing top covers and accessories by in fact changing the radii of curvature and the angle of the walls in relation to the cage floor.

The present invention is directed to an improved cage which results from a method for making same which includes an innovative release technique. The improved cage design provides increased floor area at the 0.5 inch height above the floor bottom. The cage's increased area enables the researcher or caretaker to house five mice in accordance with the Guide's interpreted standard for this cage size. The improved cage, and especially the molding release techniques, accomplish this by: allowing the side and end wall angles, relative to the plane of the floor, to approach 90° as closely as is necessary, which, when taken together with a change in the corner radii, achieve a floor area of more than the desired 75 $in^2$ at the 0.5 inch height. The stacking of the units is also readily achieved while still accommodating existing top lids and accessories.

Through the utilization of mechanical mold release techniques for the first time in the fabrication of the improved cage product of this type, production quantities can be easily produced having less structural stress and surface scratching on the cage walls. This makes the final product cost competitive in this high volume field.

It is therefore a primary object of the present invention to provide an improved animal cage whereby, through innovative fabrication techniques, a product is cost effectively manufactured, in production quantities, which meets the interpreted Guide requirements for increased floor space, while still providing compatibility with existing top covers and accessory equipment.

It is a further object of the invention to provide such an improved cage product that does not introduce additional stress factors in the side and end wall elements of the product.

It is yet another object of the invention to produce an improved animal cage product that through the adjustment of the wall angle and radius of curvature of the walls in relation to the floor of the cage product, the floor area at the floor surface and/or at an imaginary plane above the floor surface can be adjusted to meet applicable standards; and to accommodate existing top covers and accessories, as well as enabling the nesting of the cage products, one on top of each other, for easy storage.

A still further object of the present invention with its innovative mold release technique, is the significant reduction of structural stress that heretofore has been experienced in the manufacture of animal cage products of the general nature of those described herein.

SUMMARY OF THE INVENTION

An improved animal cage product having a desired internal surface profile, and produceable in cost—effective, production quantities and configured to receive a prior art lid and/or accessories is formed in a mold between a male and female portion in a molding process employing innovative mold release techniques.

The animal cage product includes: a cage floor disposed in a first plane; first and second end walls, each oppositely disposed from the other and including a bottom edge and a top edge and having an interior surface and an exterior surface; first and second side walls, again, each oppositely disposed from the other and including a bottom edge and a top edge and having an interior surface and an exterior surface; and, curved wall segments, connected respectively between the cage floor and the bottom edges of each of the side and end walls. The four, curved wall segments having an interior radius of curvature of a first, predetermined dimension and an exterior radius of curvature of a second, predetermined dimension.

The interior surface of each end and side wall extends upward a first predetermined distance from the plane of the floor at a first predetermined angle off vertical. The interior surface continues above this first predetermined distance for at least a portion of the distance remaining to the top edge of the respective wall at a second predetermined angle off vertical. The predetermined dimensions for the radii of curvature and the angle adjustment of the walls enables the adjustment of the area of the floor surface and that of an imaginary surface parallel to the floor, at, for example, 0.5 inches above the floor surface. The area of this imaginary surface for the dimensional choices described in the preferred embodiment provide for a 75 $in^2$ at the 0.5 inch height. Further, the cage product described can be removeably nested in the top opening of other such cage products.

The innovative mold release techniques used in the molding process comprise provisioning the male portion with a mechanical mold release means. The mechanical mold release means includes a first fixed segment; and at least one moveable, knockout segment. The preferred embodiment describes the use of two such knockout segments. Each knockout segment typically includes an outer surface having a knockout contact surface and a wall forming surface. The moveable, knockout segment is moveable from a first position to a second position in relation to the first fixed segment—after the molding of the animal cage product.

The moveable segment when in said first position collectively forms, with the first fixed segment, the male portion of the mold. As collectively formed the male portion of the mold has a substantially integral outer surface configuration dimensioned substantially equivalently to the desired internal surface profile of said formed cage product. The wall forming surface of the moveable segment, when the moveable knockout segment is in the first position, is disposed in contact with a substantial portion of the interior surface of the wall it forms, between its respective bottom and top edges.

As the moveable, knockout segment is moved from the first position to the second position, its respective wall forming surface is disengaged from integral contact with the interior surface of the corresponding formed wall of the formed cage product immediately upon initiation of its movement from said first position.

The knockout contact surface remains in contact with the formed cage product as the moveable segment moves from its first position to the second position. The disengagement from the wall surface reduces by a substantial amount, the drag that would otherwise be experienced and as well attending structural stress and surface marring. The formed product is readily separated and thereafter easily removed from the mold as the knockout surface continues to urge the product piece off the mold.

A means for moving each moveable, knockout segment is disclosed for the preferred embodiment which includes each moveable, knockout segment having a cam portion and a cam follower portion. The fixed segment includes a respective cam follower surface for coacting with the corresponding cam follower, such that as the moveable, knockout segment moves from the first position to the second position, with the cam follower tracking its respective cam follower surface, the moveable, knockout segment is directed perpendicularly away form its corresponding wall surface so that the segment is disengaged form integral contact with the interior surface of the formed cage product.

In the embodiment described, the first predetermined angle is about one degree off vertical; and the second predetermined angle is about two degrees off vertical. This change in the wall angle occurs about 1 and $\frac{1}{16}$ inches above the surface of the cage floor.

BRIEF DESCRIPTION OF THE DRAWINGS

A fuller understanding of the specifics of the invention, its advantages and its objects, to the accompanying and the description is necessary.
In the drawings.

DESCRIPTION OF THE PREFERRED EMBODIMENT

In order to better appreciate the objects and advantages of the present invention, the reader is directed initially to FIGS. 1 through 4 inclusively. These drawings depict the improved animal cage product of the present invention. The product 20 includes a cage floor 22 disposed in FIG. 2 in a horizontal, first plane. Extending upwardly from the cage floor 22 as viewed in FIG. 2. are first and second end walls 24 and 26. Each said end wall includes a bottom edge and top edge, 28, 30, 32 and 34; and a respective interior surface 36 and 38.

The cage product further includes first and second side walls, 40 and 42. These two include a respective bottom edge and top edge, 44, 46, 48 and 50; and include interior surfaces 52 and 54.

First and second curved wall segments 56 and 58, and third and fourth curved wall segments 60 and 62 form the continuum between the cage floor 22 and the respective end and side walls, 24, 26, 40 and 42. The first, second, third and fourth curved wall segments have an interior radius of curvature, 64 of a first predetermined dimension; and an exterior radius of curvature 66 of a second predetermined dimension, both of which will be discussed hereinafter.

Figure 2:
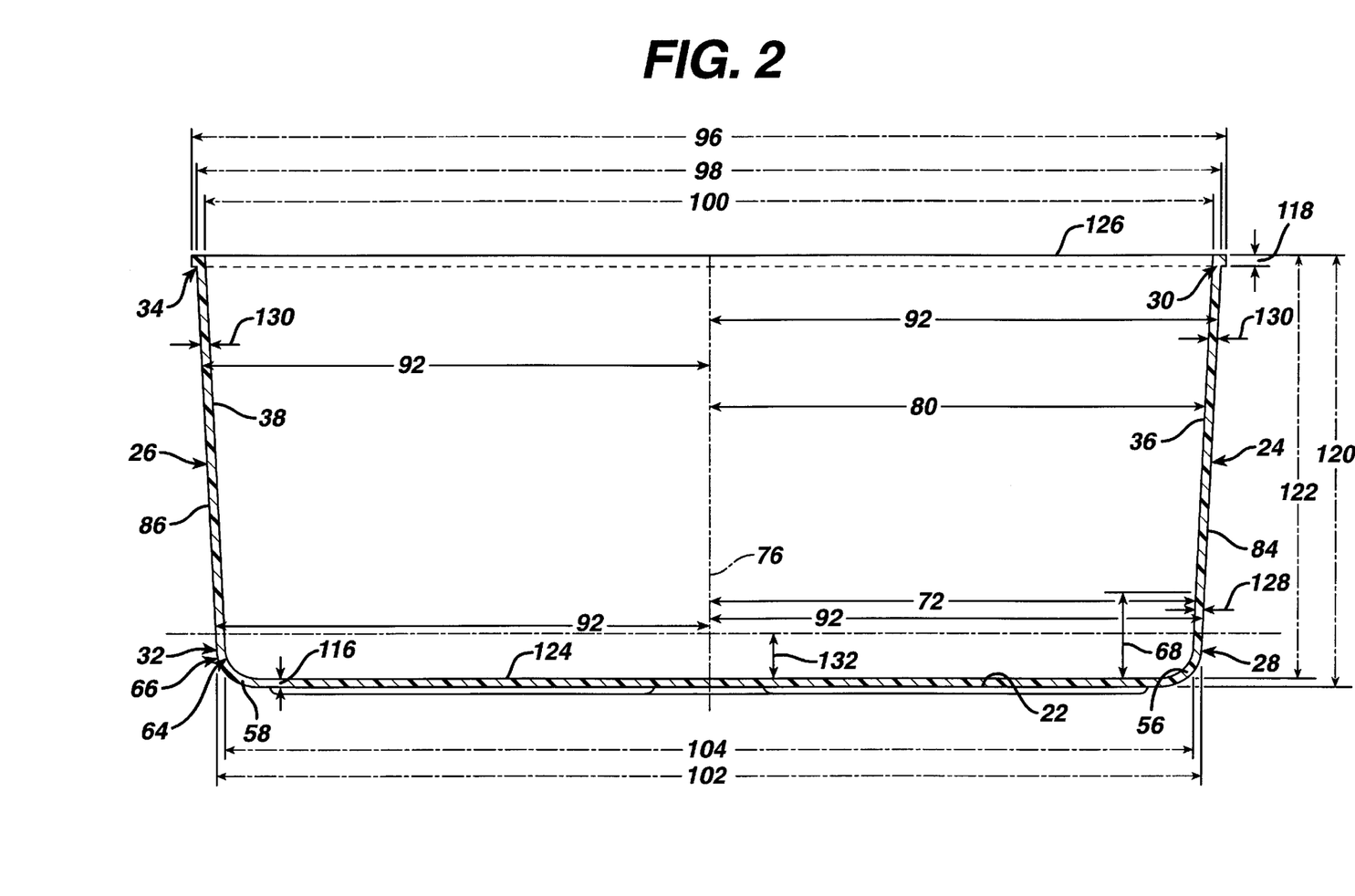
FIG. 2 is a side elevational, sectional view of the present invention viewed along the lines 2—2 of FIG. 1.
Figure 3:
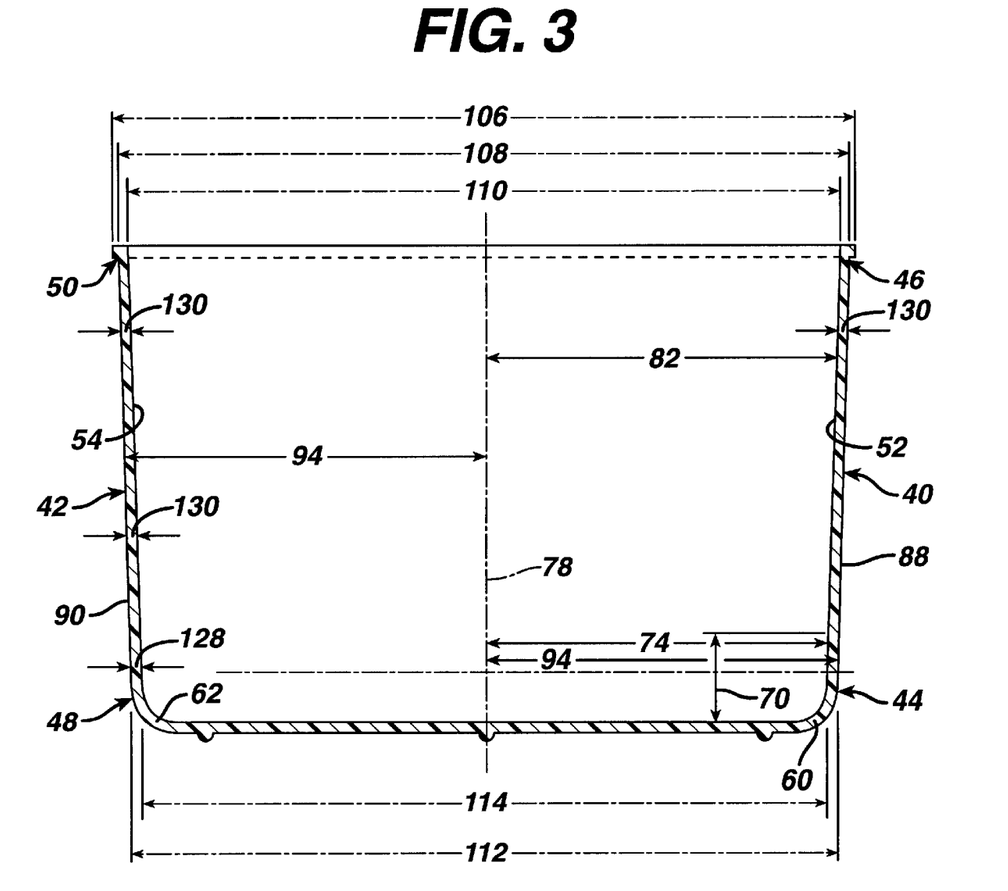
FIG. 3 is an end side elevational, sectional view of the present invention taken along the lines of 3—3 of FIG. 1.

The interior surfaces of the end and side walls, 36, 38, 52 and 54 extend upwardly, initially, a first predetermined distance 68 and 70 above floor surface 22 at a first predetermined angle 72, 74 off the vertical 76 and 78 which, again, will be discussed specifically hereinafter. The interior surfaces of the end and side walls, again, 36, 38, 52 and 54 continue above predetermined distances 68 and 70, at a second predetermined angle 80, 82 off the vertical 76 and 78 throughout their length until they reach their respective top edges, 30, 34, 46 and 50.

Exterior wall surfaces 84, 86, 88 and 90 are at the same, third predetermined angle 92 and 94 along the entire length of the exterior surface between the respective bottom edge and top edge of the respective wall. Employing standard manufacturing techniques for molding such products, incorporating an innovative mold relief step as discussed hereinafter, production quantities of the described cage product are produceable in a cost effective manner. These units provide the interpreted Guide standard calling specifically for 75 square inches to accommodate 5 mice. The dimensions achieved employing the product fabrication techniques to be disclosed hereinafter include the following dimensions as referenced on the accompanying figures. These dimensions are nominal mold dimensions and may vary from the final cage product by tolerance variations due principally to shrinkage of the plastic part during the molding process. The nominal molded product dimensions for the production unit are as follows:

Top, outer length, 96, –11.770 inches;

End wall, top edge, outer length, 98, –11.670 inches;

End wall, top edge, inner length, 100, –11.495 inches;

End wall, bottom edge, outer length, 102, –11.374 inches;

End wall, bottom edge, inner length, 104, –11.218 inches;

The two bottom edge dimensions are measured at the tangent of the respective radii of curvature 56 and 58 and the bottom edge of the respective end or side wall. As such they are in fact below the half inch location where the 75 square inches is sought, for a typical situation where the interior radius of curvature, 64, of 0.375 inches, is utilized. In the production model of the described product, the exterior radius of curvature 66 is nominally 0.437 inches.

Referring to FIG. 3, the top outer width, 106, in the production version of the improved cage product, is 7.40 inches. The other pertinent nominal dimensions are as follows:

Side wall, top edge, outer width, 108, –7.281 inches;

Side wall, top edge, inner width, 110, –7.106 inches;

Side wall, bottom edge, outer width, 112, –6.985 inches;

Side wall, bottom edge, inner width, 114, –6.829 inches.

Other dimensions of some consequence, include the floor thickness, 116, of 0.10 inches; lid edge thickness, 118, of 0.120 inches. The overall height, 120. is nominally 5.10 inches; while the height 122 above the floor interior surface 124, to the top surface of the product, 126, runs 5.0 inches.

With the change in the angle of the interior surfaces 36, 38, 52 and 54, at the predetermined distances 68 and 70, and the maintaining of the exterior surfaces' (84, 86, 88 and 90) respective angles 92 and 94, there is a thinning of the wall thickness 128 beneath the distances represented by 68 and 70. The production model produced in accordance with the techniques discussed hereinafter, adjusts the angle of the interior surface at the first predetermined distances 68 and 70, which are set at 1.0625 inches nominally. The angle 72 and 74 at and below 68 and 70 is 0.9°. Above those first predetermined distances, 68 and 70, the angle is set at 1.9° off the vertical. The side and end wall thickness, 130, above the predetermined distance of 68 and 70 is 0.092 inches. The side and end wall thickness 128 below the predetermined distance of 68 and 70 feathers down in size until it meets the curved section connecting the wall to the floor.

Thus with the judicious selection of dimensions, and, again, permitted by the innovative molding techniques to be described hereinafter, a production quantity, produceable product is made which in fact provides the 75 square inch area at the 0.5 inch height 132. Further, interference free nesting is accomplished while the top dimensions of the improved cage accommodate existing lid and accessory units.

Figure 1:
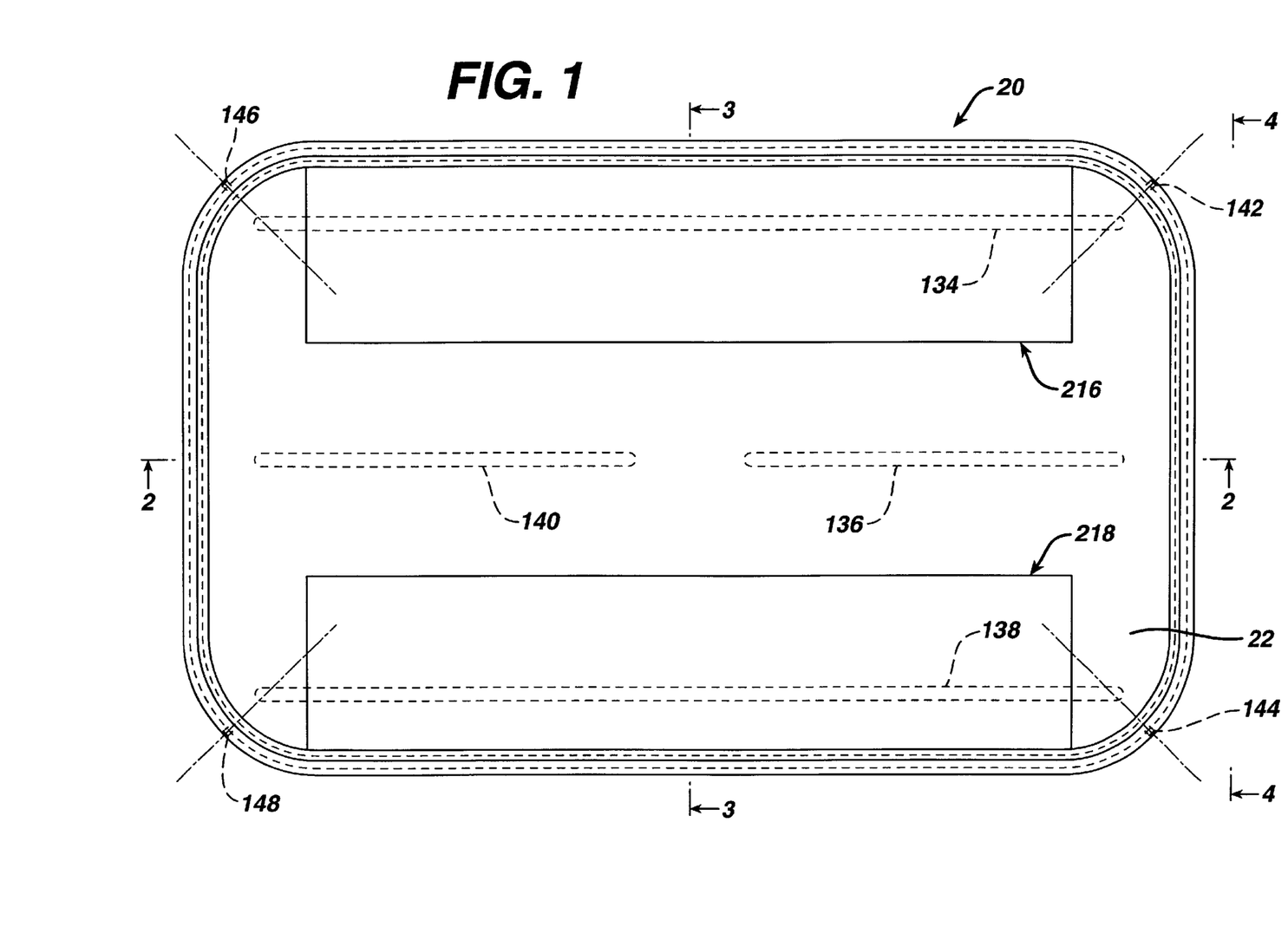
FIG. 1 is a plan view of the improved animal cage product of the present invention.
Figure 4:
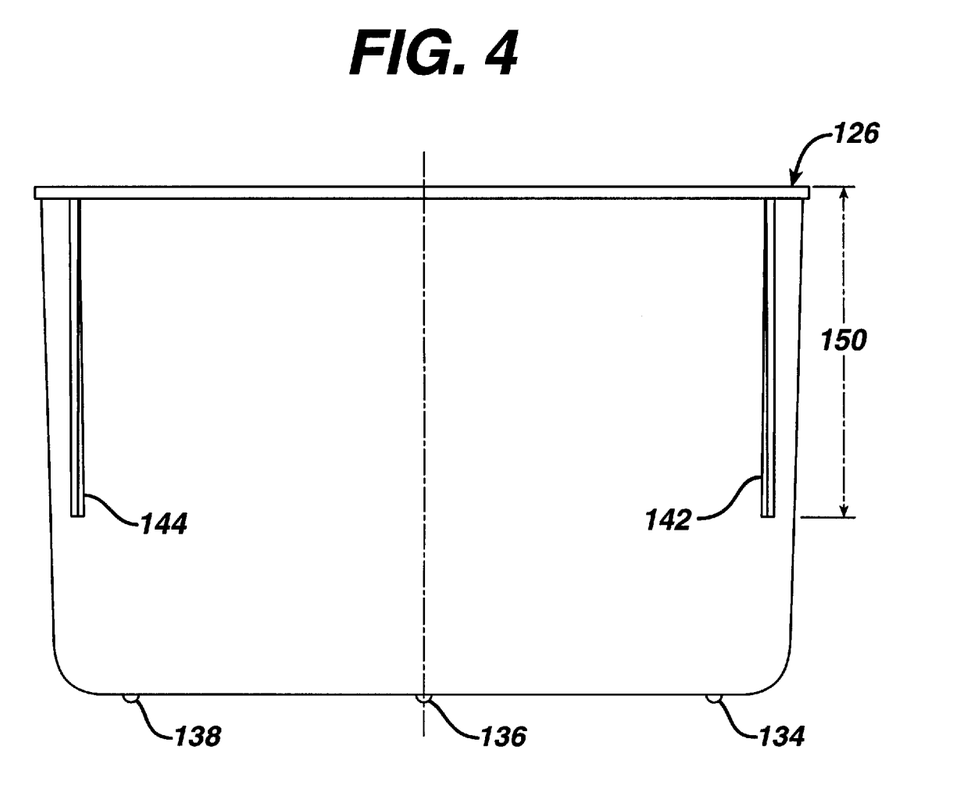
FIG. 4 is an end elevational view of the present invention taken along the lines 4—4 of FIG. 1.

FIGS. 1 and 4 depict other aspects of the improved cage product including rack support protrusions 134, 136, 138 and 140; and also protrusions 142, 144, 146 and 148 which are used to restrain the depth of nesting of one unit on another. In the production model, length, 150, extends 3.196 inches below the top surface 126 of the product.

Figure 5:
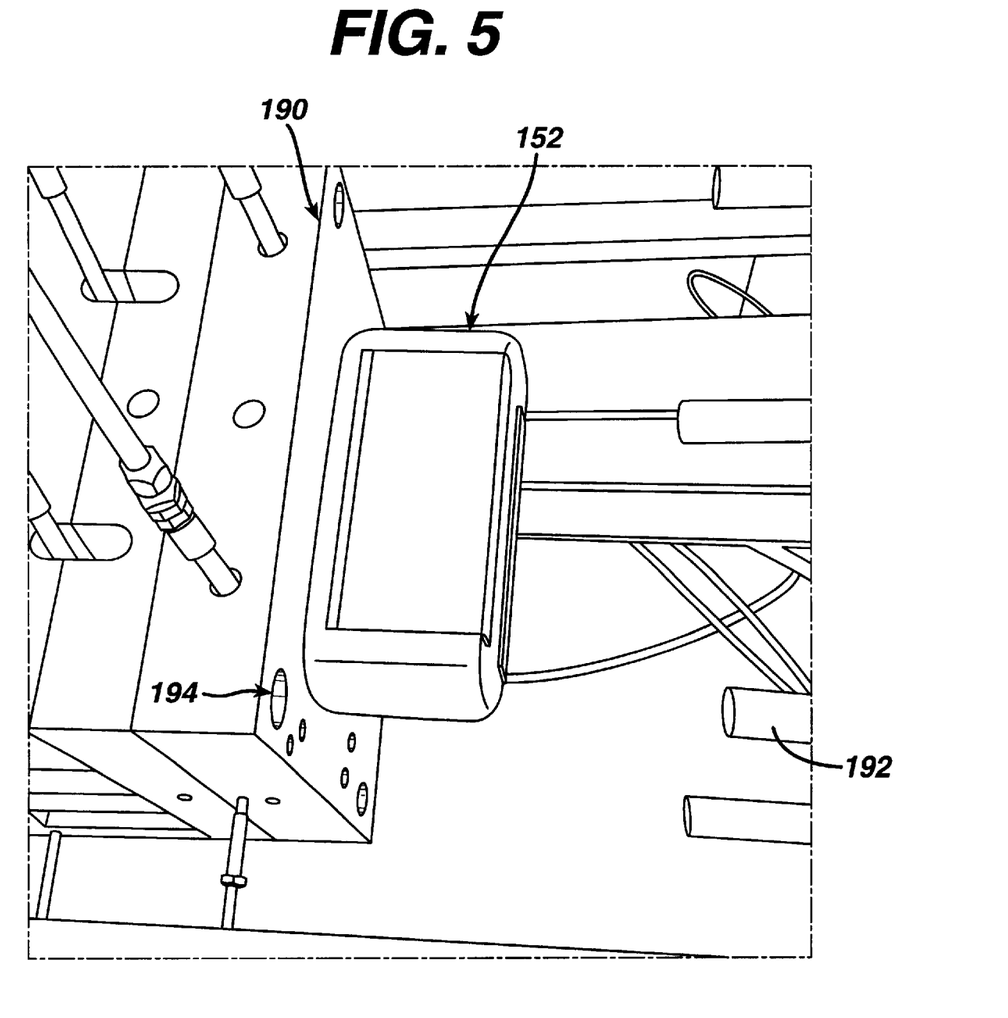
FIG. 5 is a top perspective view of the male portion of the molding apparatus used to form the improved cage product of the present invention, shown in its pre-ejection stage.
Figure 6:
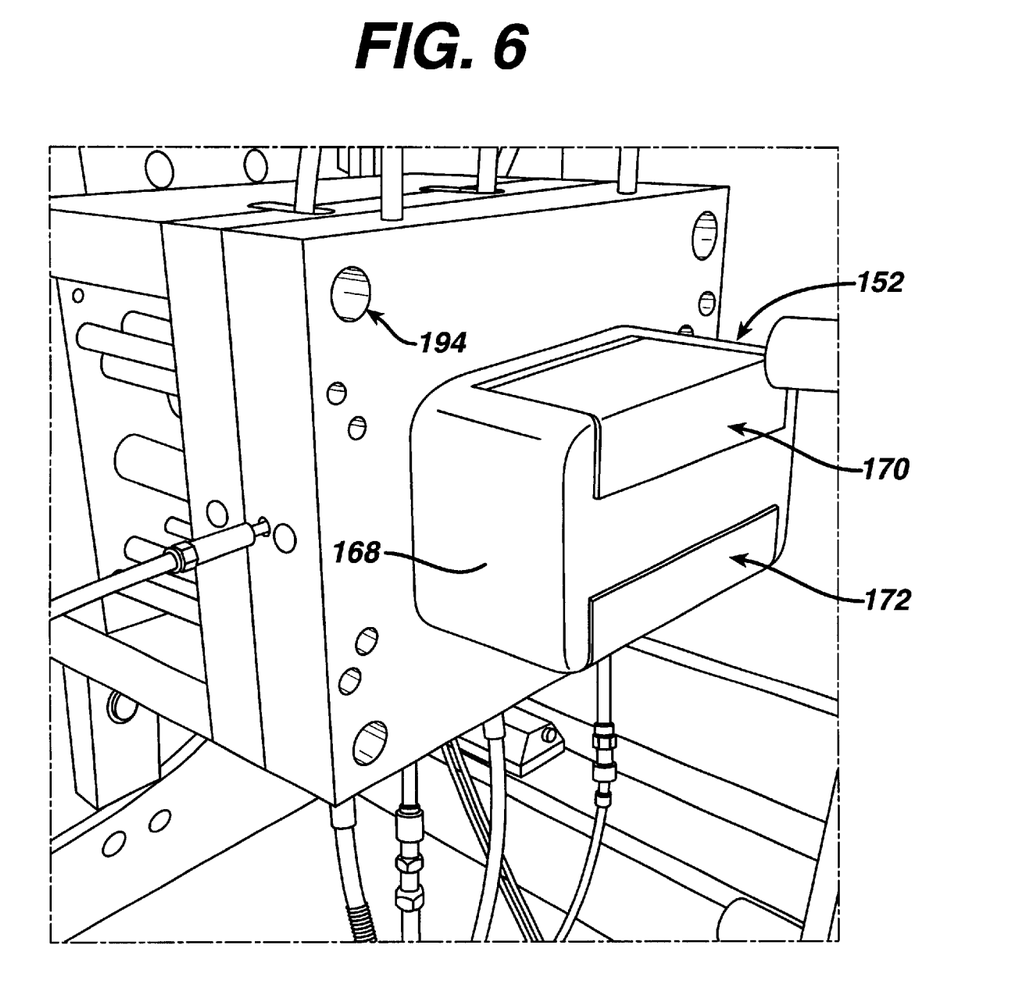
FIG. 6 is a further perspective view of the male portion of the molding apparatus, again in its pre-ejection status.
Figure 8:
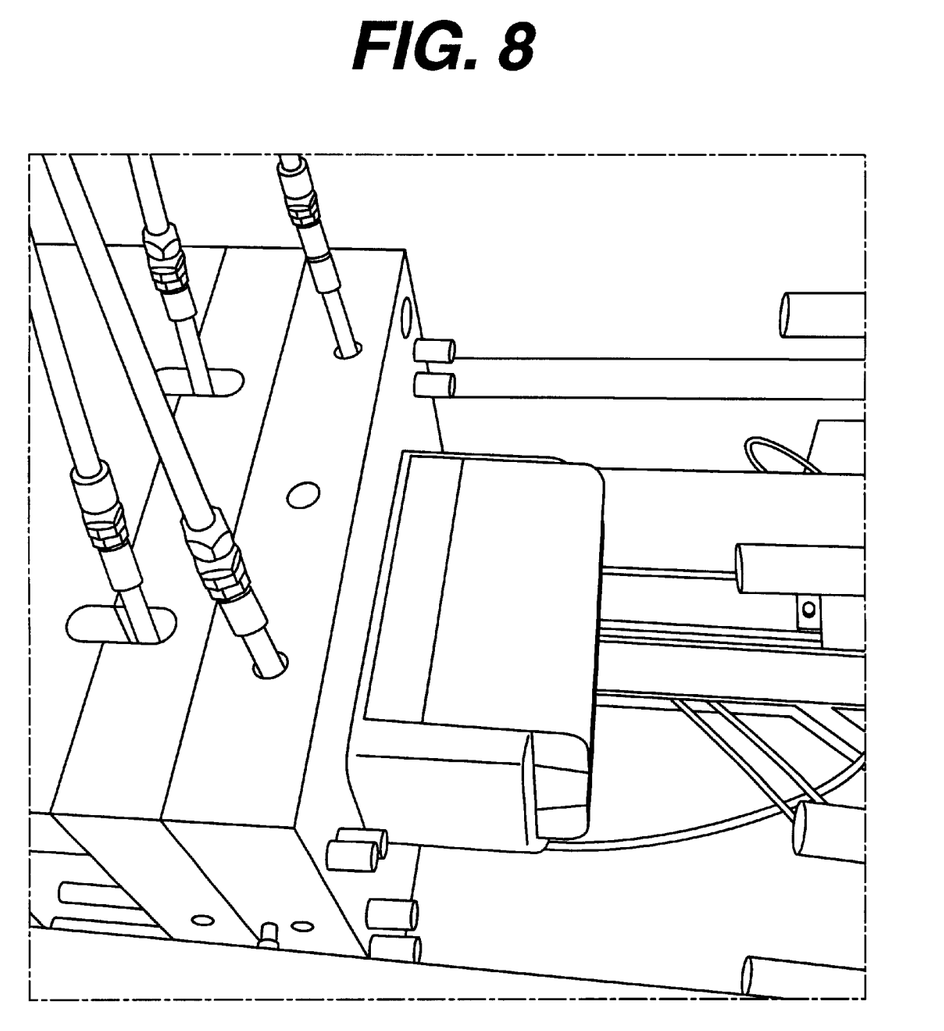
FIG. 8 is a top perspective view of the molding apparatus with the movable elements thereof in their fully extended status.
Figure 9:
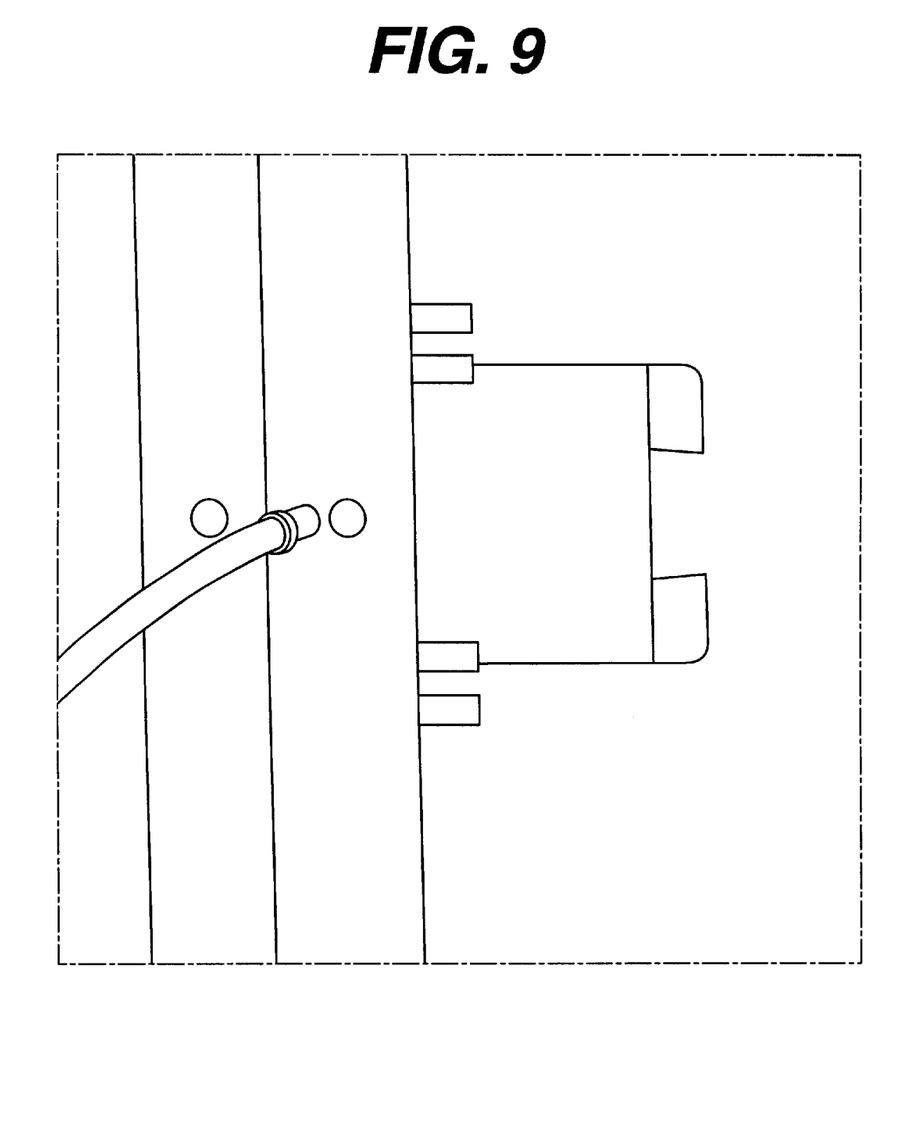
FIG. 9 is a side elevational view of the male portion of the molding apparatus showing the movable elements in their fully extended position.
Figure 10:
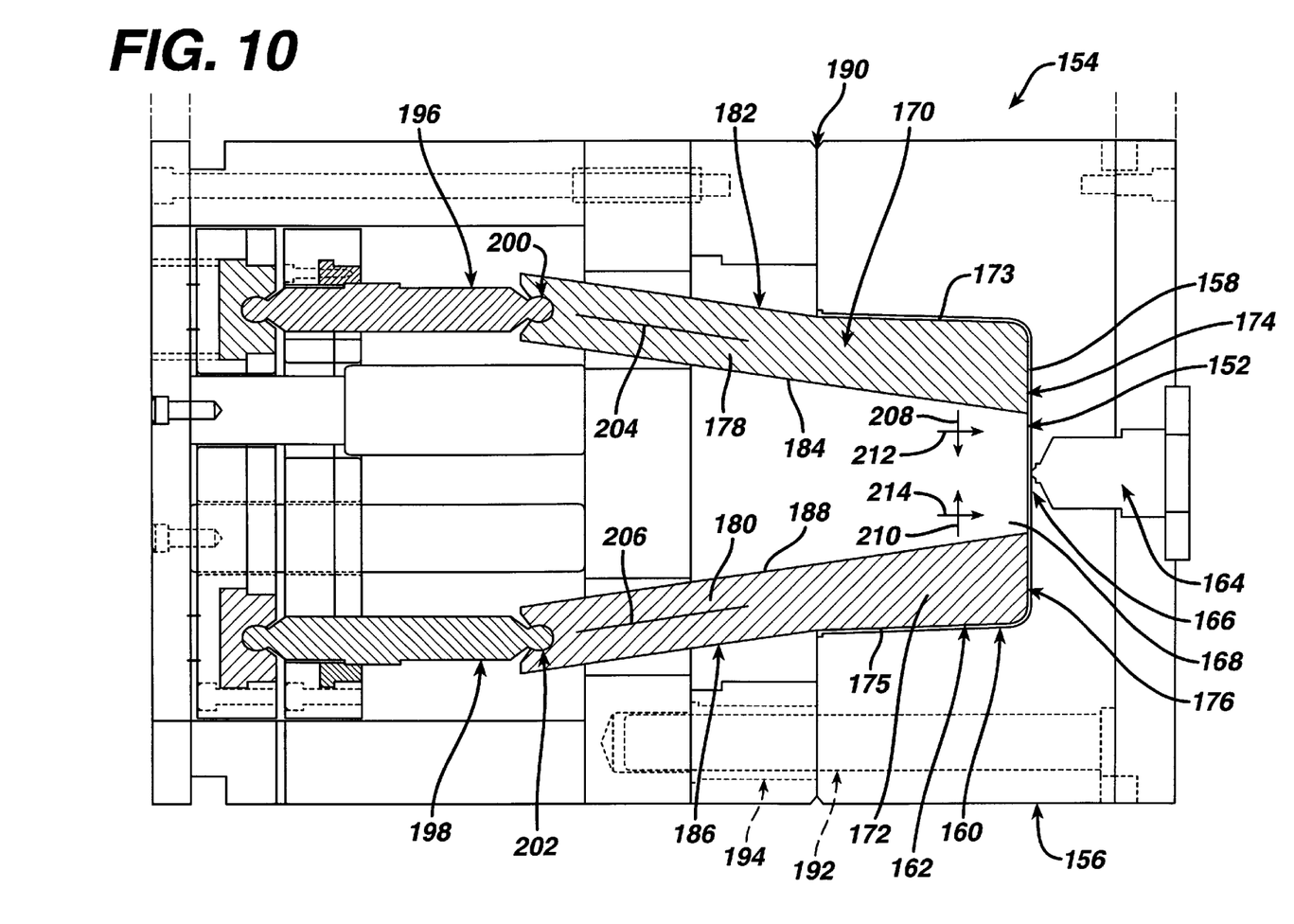
FIG. 10 is a side elevation view, partially in section, showing the critical elements of the molding apparatus including the male portion thereof, utilized in the fabrication of the improved cage product of the present invention.
Figure 11A:
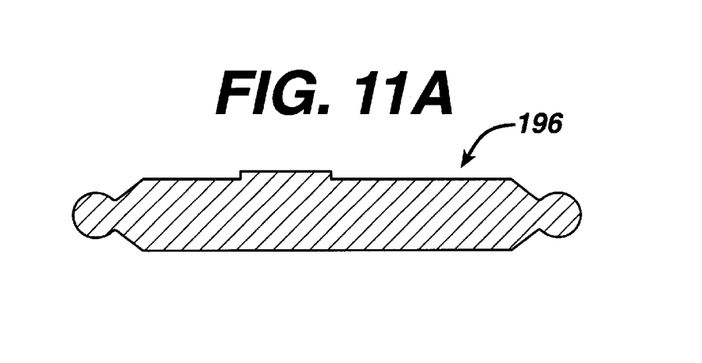
FIG. 11A is a side elevation view of the cam push rod portion of the male portion of the molding apparatus of the present invention.
Figure 11B:
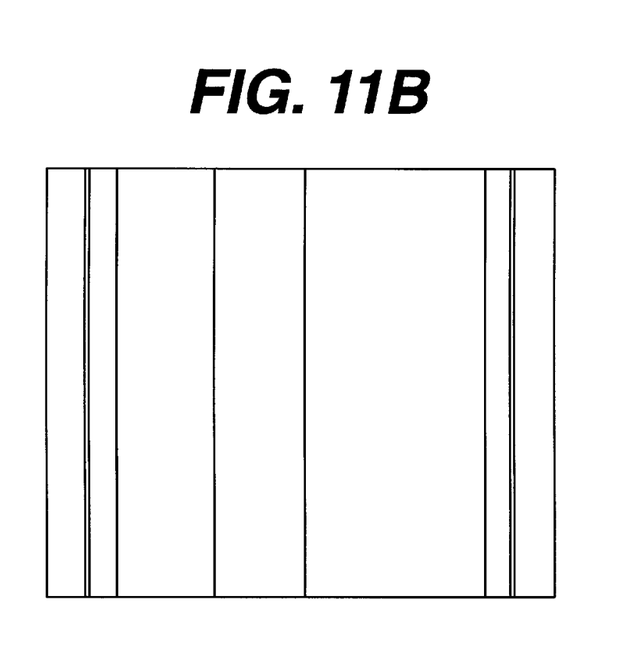
FIGS. 11B and 11C are plan and end elevational views respectively of the cam push rod shown in section in FIG. 11A.
Figure 11C:
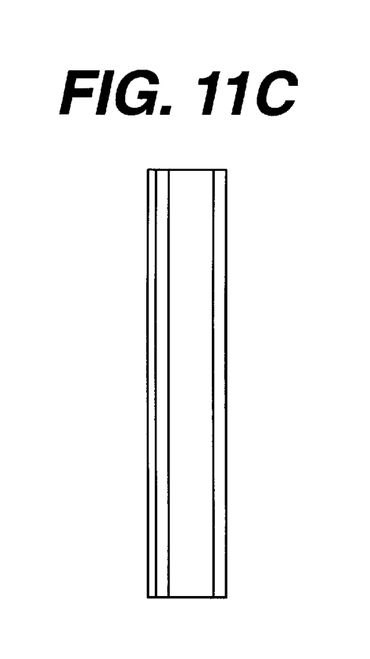

The discussion at this point turns to the molding process utilized to form the cage product of the present invention with specific focus on the innovative mechanical mold release means as depicted in FIGS. 5 through 12. FIGS. 5 and 6 are perspective views of the male portion 152 of the mold 154 (see FIG. 10). Female portion 156 is seen in FIG. 10 and forms a cavity 158 between itself and the male portion of the mold 152 wherein the cage product of the present invention is formed. The cavity 158 is positioned between the mold cavity surface 160 and the mold core surface 162 formed by the male portion of the mold.

The animal cage product of the present invention is formed from a suitable engineering plastic such as a low and high temperature polycarbonate such as LEXAN®, manufactured by GE; or from various other plastic products which can withstand the harsh treatment of chemical washes. These include polysulfone, marketed under the trademark UDEL®, manufactured by Amoco Polymers; polyethersulfone, marketed under the trademark RAYDEL A®, manufactured by Amoco; polythenylfulfone, marketed under the trademark RAYDEL R®, manufactured by Amoco; and polyethherimide, marketed under the trademark ULTEM®, and manufactured by GE. The plastics material pass through an injection unit well known in the art in which the temperature is raised to typically 600° to 750° Fahrenheit for the plastic materials listed above. The viscous plastic material is directed through an output nozzle into the mold through a sprue assembly 164 end gate 166 into the mold cavity 158 where the cage product is formed. The mold parts are made from P-20 steel.

Figure 12A:
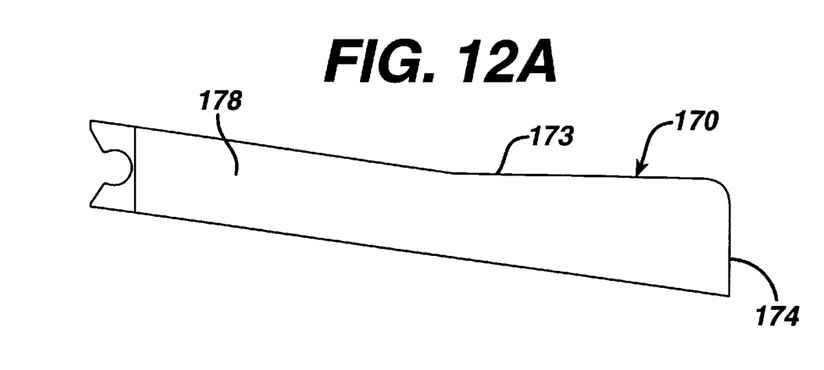
FIG. 12A is a side elevation view of one of the movable segments or cams of the male portion of the molding apparatus of the present invention.
Figure 12B:
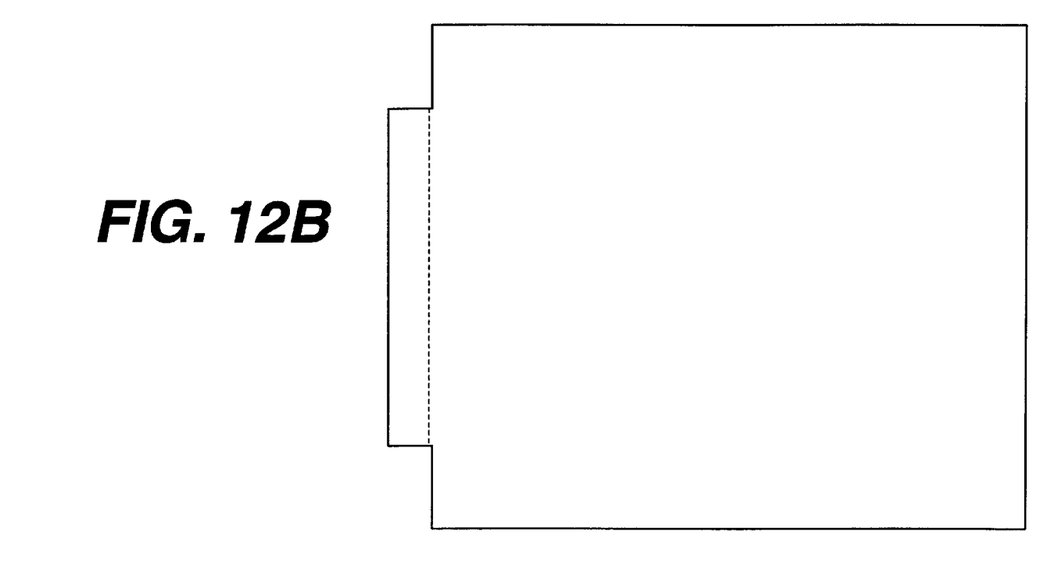
FIGS. 12B and 12C are plan and end elevational views respectively of the movable segment depicted in FIG. 12A.
Figure 12C:
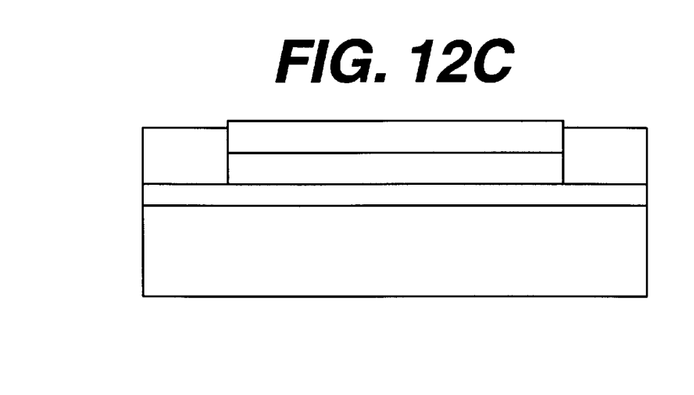

The male portion of the mold includes a fixed segment 168 and in the preferred embodiment a first and second moveable, knock-out segment 170 and 172. The moveable, knock-out segments move from a first position as shown in FIGS. 5, 6 and 10, to a second, fully extended position shown in FIGS. 8 and 9, when it is time to release the formed product from the mold. This action will be discussed more fully, subsequently. FIGS. 12A, 12B and 12C, depict one such moveable, knock-out segment, 170. The segment is seen to be substantially wide, approximately 6 inches in the particular application described herein. Each of the moveable segments includes a knock-out contact surface 174 and 176 and a further, product-wall, forming surface, 173 and 175. These outer surfaces of the moveable segments, including the knock-out compact surfaces work together with the outer surfaces of the fixed segment 168 so as to form collectively the integral mold core surface of the male portion of the mold. This mold core surface is configured to form the desired internal surface profile of the formed cage product. Similarly, the mold cavity surface 160 of the female portion 156 of the mold defines the exterior configuration of the final product.

Each moveable segment 170 and 172 includes a cam portion 178 and 180 which is positioned in a corresponding fixed opening in fixed segment 168. Each cam is guided in its movement between a first and second position by cam follower surfaces 182, 184, 186 and 188.

In operation, initially, the first and second moveable segments are retracted into the first position as depicted in FIGS. 5, 6 and 10. The mold core or male portion 152 and mold cavity or female portion 156 are brought together at parting line 190. leader pins such as 192 align with a corresponding leader pin bushing, 194, to effect the precise, proper alignment of the male and female portions of the mold.

After the cavity 158 is filled with the viscous plastic material the desired product is formed about the integral outer surface configuration of the male portion of the mold. As the plastic material cools, it shrinks about the outer surface of the male portion increasing the degree of difficulty experienced in subsequently removing the product from the male portion of the mold. In the application where angles on the order of one to two degrees off vertical are necessary to achieve the desired area at or near the floor of the cage, the degree of difficulty in removing the product from the mold is significantly increased. With the innovative mold release technique described hereinafter, it frankly does not matter if the angle off vertical were close to 0°. The described technique significantly reduces the contact surface between the male portion and sides of the formed product, after the forming of the product, so as to readily allow for the separation of the product and its easy removal from the mold. The release mechanism operates as follows.

Figure 7:
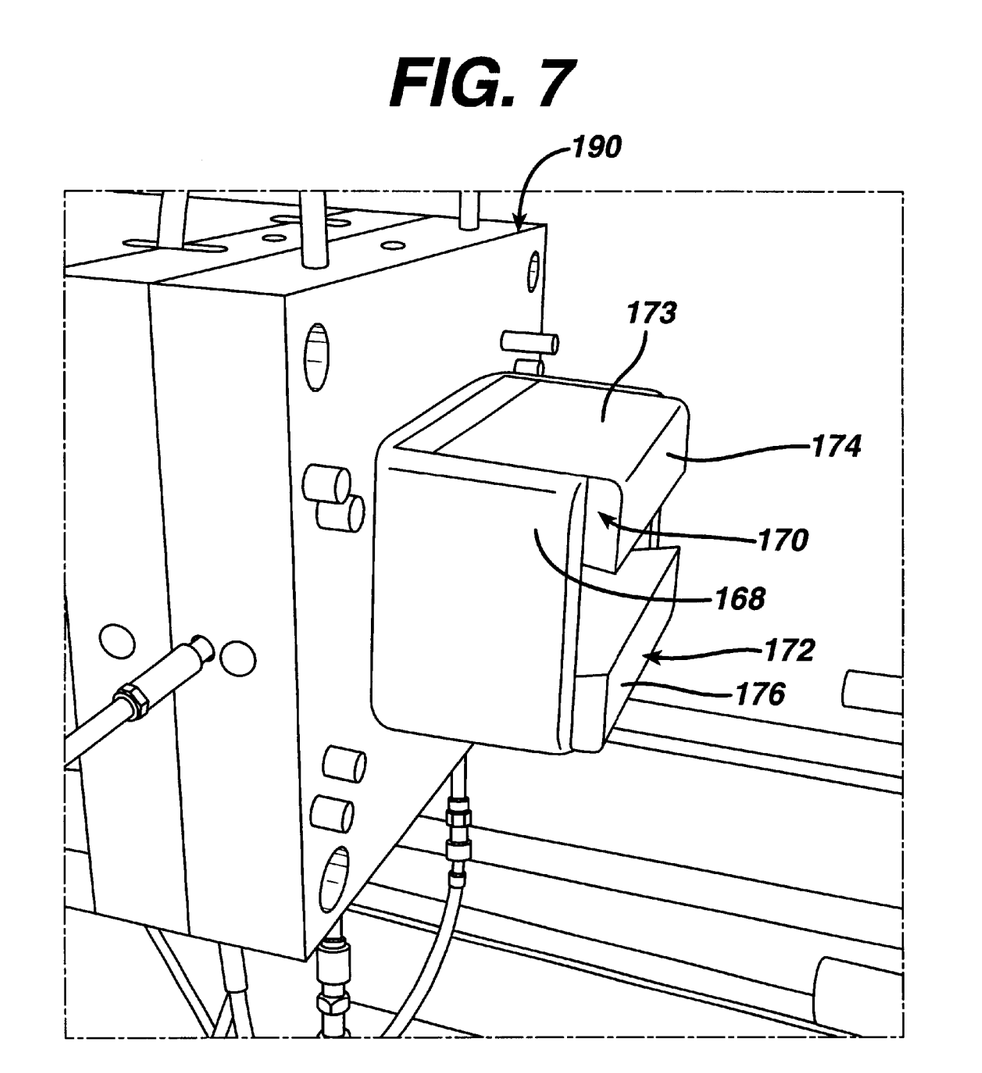
FIG. 7 is a perspective view of the male portion of the molding apparatus of the present invention showing movable elements thereof partially moved from its pre-ejection status.

After sufficient cooling, the male portion of the mold is withdrawn from contact with the female portion along parting line 190. Initially, the formed product remains snugly positioned about the male portion of the male. At this moment, when it is desired to release the product from the mold, push rods not seen enter the mold from the left as viewed in FIG. 10 and urge cam push rods 196 and 198 to the right as viewed in FIG. 10. The push rods 196 and 198 include a universal-type connection 200 and 202 to the cam portions 178 and 180. This permits the horizontal movement of the cam push rods 196 and 198 again as viewed in FIG. 10 to be converted into movement in the direction of axes 204 and 206 of the cam as it moves along cam follower pathways defined by 182, 184, 186 and 188. This axial movement along axes 204 and 206 is converted to movement downward or upward along axes 208 and 210 as well as movement to the right along axes 212 or 214 of the moveable elements 170 and 172 as they proceed to a second, fully extended position as depicted in FIGS. 8 and 9. FIG. 7 shows an intermediate position of the moveable segments 170 and 172 before full extension is accomplished.

At the initial movement of the cam push rods 196 and 198 to the right, there is immediate movement of wall surfaces 173 and 175 away from the corresponding interior surface of the side walls of the formed product. Since these surfaces, 173 and 175 extend a substantial portion of the length of the side walls of the formed product, there is an obvious significant reduction in the resistance to releasing the formed product from the male portion of the mold. Again, the moveable segments 170 and 172 continue to the right as viewed in FIG. 10 to a final second position in relation to the fixed segment 168. At this second position, push rods continue to move from the male portion of the mold, coacting with the top surface 126 of the formed product, in a known manner, typically at the end walls, to finish the release of the product from the mold.

Referring to FIG. 1, again, the impressions 216 and 218 form in the floor interior surface 124 of the formed product depict the breadth of the contact area between the knock-out contact surfaces 174 and 176 and the bottom surface of the cage product. This relatively substantial knock-out contact surface area when taken together with the immediate release of wall surfaces 173 and 175 from the length-wise side, side walls of the formed product cooperate to ensure the ready removal of the product from the mold notwithstanding the almost, 90° angle formation between the side and end walls and the plane of the floor surface of the formed product.

While in the preferred embodiment, two moveable segments are described as working together to significantly facilitate the reduction of drag forces between the mold surfaces and the formed product, it is expected that those of ordinary skill in the art in view of the teachings of the present invention can modify same to effect the purposes of the invention with a single moveable surface, or additional moveable segments.

In view of the enhanced release capabilities described in the present invention, it is practically achievable, that angles on the order of less than 1° off vertical can be easily achieved with a formed product such as that described herein to the extent such reduction in angle would effect the purposes of increased square area at the ½ inch mark above floor surface as well as the nesting requirements for products of this type. With a reduced angle below 1°, in order to accomplish the further requirement of nesting, it would necessitate a reduction in the wall thickness. Due to the inherent weakness of thinner wall structures, there may be a practical tradeoff here that does not warrant any further reduction in the wall angle. With the innovative release technique described herein, however as a practical matter the smaller side wall angles can be achieved provided the other consequences are acceptable.

Still further, even though a specific embodiment has been described implementing the improved molding release techniques, and enhanced formed product, other variations within the spirit of the present invention should now be apparent to those of ordinary skill in the art. The present invention should not limited in its breadth by the described embodiment but rather it is to be defined by the scope of the claims which follow.

What is claimed:

1. An improved animal cage product having a desired internal surface profile, produceable in cost-effective, production quantities and configured to receive a prior art lid and/or accessories, comprising:
   (a) a cage floor disposed in a first plane;
   (b) first and second end walls, each said end wall oppositely disposed from each other and including a bottom edge and a top edge and having an interior surface and an exterior surface;
   (c) first and second side walls, each said side wall oppositely disposed from each other and including a bottom edge and a top edge and having an interior surface and an exterior surface;
   (d) a first curved wall segment and a second curved wall segment, connected respectively between said cage floor and said bottom edge of said first and second end walls;

(e) a third curved wall segment and a fourth curved wall segment, connected respectively between said cage floor and said bottom edge of said first and second side walls;

said first, second third and fourth curved wall segments having an interior radius of curvature of a first, predetermined dimension and an exterior radius of curvature of a second, predetermined dimension, the interior surface of each said end wall and said side wall extending upward a first predetermined distance from the first plane at a first predetermined angle off vertical and continuing above said first predetermined distance for at least a portion of the distance remaining to the top edge of the respective wall at a second predetermined angle off vertical, whereby the square area of an imaginary surface at a prescribed distance above the plane of said cage floor and parallel to said plane meets or exceeds a standard—set, figure, and whereby one such cage product can be removeably nested in the top opening of a second such cage product, said improved animal cage product formed by a molding process wherein a suitable plastic material is molded to a final configuration in a mold having a male portion and a female portion, said animal cage product formed between said male portion and said female portion, said male portion including a mechanical mold release means, said mechanical mold release means including, (f) a first fixed segment;

(g) and at least a first moveable, knockout segment having an outer surface including a knockout contact surface and a wall forming surface, said at least said first moveable, knockout segment moveable from a first position to a second position in relation to said first fixed segment after the molding of the animal cage product;

wherein said at least said first moveable segment when in said first position collectively forms with said first fixed segment, said male portion of the mold, said collectively formed male portion of the mold having a substantially integral outer surface configuration dimensioned substantially equivalently to the desired internal surface profile of said formed cage product and about which said cage product is formed together with said female portion, said wall forming surface, when said moveable knockout segment is in said first position, disposed in contact with a substantial portion of the interior surface of at least one of said walls between its respective bottom edge and its top edge; and, (h) means for moving said at least said first moveable, knockout segment from said first position to said second position, whereby as said at least said first moveable segment moves from said first position to said second position, said wall forming surface is disengaged from integral contact with the interior surface of said corresponding formed wall of said formed cage product immediately upon initiation of movement of said at least said first moveable segment from said first position, and wherein said knockout contact surface of said at least said first moveable, knockout segment remains in contact with the formed cage product as it moves from said first position to said second position, whereby the formed product is readily separated and thereafter easily removed from the mold.

2. The improved animal cage product claimed in claim 1 having:

a first and second moveable, knockout segment, said first moveable knockout segment having an outer surface including a first knockout contact surface and a first wall forming surface, said first moveable, knockout segment moveable from a first position to a second position in relation to said first fixed segment after the molding of the animal cage product;

said second moveable, knockout segment having an outer surface including a second knockout contact surface and a second wall forming surface, said second moveable, knockout segment moveable from a first position to a second position in relation to said first fixed segment after the molding of the animal cage product;

wherein said first and second moveable segments when in said first position collectively form with said first fixed segment, said male portion of the mold, said collectively formed male portion of the mold having a substantially integral outer surface configuration dimensioned substantially equivalently to the desired internal surface profile of said formed cage product and about which said cage product is formed together with said female portion, said first and second wall forming surfaces, when said first and second moveable knockout segments are in said first position, each disposed in contact with a substantial portion of the interior surface of a respective wall between its respective bottom edge and its top edge; and, (i) means for moving said first and second moveable, knockout segments from said first position to said second position, whereby as said first and second moveable segments move from said first position to said second position, each said respective wall forming surface is disengaged from integral contact with the interior surface of said corresponding formed wall of said formed cage product immediately upon initiation of movement of said first and second moveable segments from said first position, and wherein said first and second knockout contact surface of said first and second, moveable knockout segments remains in contact with the formed cage product as it moves from said first position to said second position, whereby the formed product is readily separated and thereafter easily removed from the mold.

3. The improved animal cage product claimed in claim 2 wherein said means for moving each said moveable, knockout segment include each said moveable, knockout segment having a cam portion and a cam follower portion, said first fixed segment including a respective cam follower surface for coacting with each said cam follower, whereby as each said moveable, knockout segment moves from said first position to said second position, each said cam follower tracks its respective cam follower surface such that each said moveable, knockout segment is disengaged from integral contact with the interior surface of said formed cage product whereby the formed product can be readily removed from the mold.

4. The animal cage product claimed in claim 2 wherein said first predetermined angle is about one degree off vertical and said second predetermined angle is about two degrees off vertical.

5. The animal cage product claimed in claim 2 wherein said first predetermined distance is approximately 1 and 1/16 inches.

6. The improved animal cage product claimed in claim 1 wherein said means for moving each said moveable, knockout segment include each said moveable, knockout segment having a cam portion and a cam follower portion, said first fixed segment including a respective cam follower surface for coacting with each said cam follower, whereby as each said moveable, knockout segment moves from said first position to said second position, each said cam follower tracks its respective cam follower surface such that each said moveable, knockout segment is disengaged from integral contact with the interior surface of said formed cage product whereby the formed product can be readily removed from the mold.

7. The animal cage product claimed in claim 6 wherein said first predetermined angle is about one degree off vertical and said second predetermined angle is about two degrees off vertical.

8. The animal cage product claimed in claim 6 wherein said first predetermined distance is approximately 1 and $\frac{1}{16}$ inches.

9. The animal cage product claimed in claim 1 wherein said first predetermined angle is about one degree off vertical and said second predetermined angle is about two degrees off vertical.

10. The animal cage product claimed in claim 1 wherein said first predetermined distance is approximately 1 and $\frac{1}{16}$ inches.

\* \* \* \* \*

UNITED STATES PATENT AND TRADEMARK OFFICE
CERTIFICATE OF CORRECTION

PATENT NO. : 6,293,227 B1  
DATED : September 25, 2001  
INVENTOR(S) : Richard P. VerHage It is certified that error appears in the above-identified patent and that said Letters Patent is hereby corrected as shown below:

Column 11,  
Line 10, change the numeral "6" to -- 3 --.

Column 12,  
Line 1, change the numeral "6" to -- 3 --.

Signed and Sealed this

Twenty-eighth Day of May, 2002

Attest:

Attesting Officer

JAMES E. ROGAN  
Director of the United States Patent and Trademark Office